United States Patent [19]
Durand

[11] Patent Number: 5,966,813
[45] Date of Patent: Oct. 19, 1999

[54] METHOD FOR JOINING VEHICLE FRAME COMPONENTS

[75] Inventor: Robert D. Durand, Wyomissing, Pa.

[73] Assignee: Dana Corporation, Toledo, Ohio

[21] Appl. No.: 08/996,958

[22] Filed: Dec. 23, 1997

[51] Int. Cl.[6] ............................................. B23P 15/12
[52] U.S. Cl. .......................... 29/897.2; 29/508; 29/518; 29/520; 219/611; 219/617
[58] Field of Search ................... 29/897.2, 508, 29/506, 518, 516, 520; 219/603, 617, 611

[56] References Cited

U.S. PATENT DOCUMENTS

| | | | |
|---|---|---|---|
| 2,865,094 | 12/1958 | Press ........................................... | 29/506 |
| 3,216,091 | 11/1965 | Floyd, Jr. ..................................... | 29/518 |
| 3,528,596 | 9/1970 | Carlson . | |
| 3,674,586 | 7/1972 | Rimkus . | |
| 3,699,297 | 10/1972 | Grin et al. ................................. | 219/9.5 |
| 3,715,800 | 2/1973 | Leopold et al. ........................... | 29/506 |
| 3,992,773 | 11/1976 | Duffner et al. . | |
| 4,063,208 | 12/1977 | Bernatt ..................................... | 337/248 |
| 4,067,216 | 1/1978 | Khimenko et al. ........................ | 72/56 |
| 4,150,274 | 4/1979 | Minin et al. .............................. | 219/8.5 |
| 4,321,743 | 3/1982 | Ridenour ................................... | 29/516 |
| 4,330,924 | 5/1982 | Kushner et al. ........................... | 29/508 |
| 4,377,896 | 3/1983 | Cox ........................................... | 29/516 |
| 4,482,174 | 11/1984 | Puri ........................................... | 29/508 |
| 4,504,714 | 3/1985 | Katzenstein .............................. | 219/9.5 |
| 4,523,872 | 6/1985 | Arena et al. . | |
| 4,664,423 | 5/1987 | Rowley ..................................... | 29/516 |
| 4,735,355 | 4/1988 | Browning ................................ | 29/897.2 |
| 4,804,212 | 2/1989 | Vyse ......................................... | 29/508 |
| 4,807,351 | 2/1989 | Berg et al. . | |
| 4,930,204 | 6/1990 | Schurter . | |
| 5,195,788 | 3/1993 | Oetiker ..................................... | 29/516 |
| 5,203,194 | 4/1993 | Marquardt ................................ | 29/897.2 |
| 5,322,208 | 6/1994 | Hinrichs et al. .......................... | 228/182 |
| 5,332,281 | 7/1994 | Janotik et al. ............................ | 296/209 |
| 5,409,289 | 4/1995 | Kalian et al. ............................. | 296/204 |
| 5,435,110 | 7/1995 | Stol et al. ................................. | 52/655.1 |
| 5,442,846 | 8/1995 | Snaper . | |
| 5,484,174 | 1/1996 | Gotoh et al. .............................. | 29/508 |
| 5,561,902 | 10/1996 | Jacobs et al. ............................. | 29/897.2 |
| 5,824,998 | 10/1998 | Livshiz et al. ........................... | 219/617 |

FOREIGN PATENT DOCUMENTS

| | | | |
|---|---|---|---|
| 4334230 A1 | 1/1995 | Germany ................................. | 29/897.2 |
| 48-34667 | 10/1973 | Japan ....................................... | 29/508 |
| 55-88939 | 7/1980 | Japan ....................................... | 29/508 |

*Primary Examiner*—Irene Cuda
*Assistant Examiner*—Trinh T. Nguyen
*Attorney, Agent, or Firm*—MacMillan, Sobanski & Todd, LLC

[57] ABSTRACT

A method of joining two vehicle frame components made from dissimilar materials includes providing a first frame component, and providing a second frame component made from a material which is dissimilar to the material used to make the first frame component, where one of the first and second frame components is a metallic component made of a metallic material. A portion of one of the first and second frame components is positioned within a portion of the other of the frame components in an overlapping manner, thereby forming an overlapping portion. A metallic band is disposed around the overlapping portion, and an inductor is positioned around the metallic band. The inductor is energized to generate a magnetic field for collapsing the band about the overlapping portion at a velocity sufficient to magnetic pulse weld the band and metallic component to each other, thereby securing the first and second frame components together.

20 Claims, 9 Drawing Sheets

METHOD FOR JOINING VEHICLE FRAME COMPONENTS

BACKGROUND OF THE INVENTION

This invention relates in general to vehicular body and frame assemblies and in particular to a method for joining together vehicle components, especially those manufactured from dissimilar materials, to form such a vehicle body and frame assembly.

Many land vehicles in common use, such as automobiles, vans, and trucks, include a body and frame assembly which is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit which is resiliently supported upon the vehicle wheels by the suspension system. Unitized body and frame assemblies of this general type are found in many relatively small modern vehicles, such as automobiles and minivans.

Each of these body and frame assemblies is composed of a plurality of individual vehicle frame components that are secured together. In the past, virtually all of these vehicle frame components have been manufactured from a metallic material. Steel has traditionally been the preferred material for manufacturing all of such vehicle frame components because of its relatively high strength, relatively low cost, and ease of manufacture. Vehicle frame components manufactured from metallic materials have been secured together by conventional welding techniques. More recently, however, in an effort to reduce the weight of the vehicle frame assembly, it has been found desirable to use alternative materials to form some or all of the vehicle frame components. Thus, in some instances, it may be desirable to form some or all of the vehicle frame components from materials which cannot be easily secured together, or in some cases cannot be secured together at all by conventional welding techniques. For example, conventional welding techniques cannot be used to secure a metallic vehicle frame component to a non-metallic vehicle frame component. Thus, it would be desirable to provide a method for joining vehicle components together to form a vehicle body and frame assembly, where the components are formed from alternative materials, and particularly those components manufactured from dissimilar materials, such as metallic and non-metallic materials.

SUMMARY OF THE INVENTION

The above object as well as other objects not specifically enumerated are achieved by a method of joining two vehicle frame components made from dissimilar materials, where the method includes providing a first frame component, and providing a second frame component made from a material which is dissimilar to the material used to make the first frame component, where one of the first and second frame components is a metallic component made of a metallic material. A portion of one of the first and second frame components is positioned within a portion of the other of the frame components in an overlapping manner, thereby forming an overlapping portion. A metallic band is disposed around the overlapping portion, and an inductor is positioned around the metallic band. The inductor is energized to generate a magnetic field for collapsing the band about the overlapping portion at a velocity sufficient to magnetic pulse weld the band and metallic component to each other, thereby securing the first and second frame components together.

In another embodiment of the invention, the method of joining two vehicle frame components made from dissimilar materials includes the steps of providing a first frame component of a metallic material, providing a second frame component made from a composite material, the second frame component having a protrusion, and positioning a portion of the first frame component within a portion of the second frame component in an overlapping manner, thereby forming an overlapping portion, where the protrusion is within the overlapping portion. A metallic band is disposed around the overlapping portion, and an inductor is disposed around the metallic band. The inductor is energized to generate a magnetic field for collapsing the band about the overlapping portion at a velocity sufficient to magnetic pulse weld the band and metallic component to each other, thereby securing the first and second frame components together, wherein the metallic band is crimped over the protrusion.

In yet another embodiment of the invention, the method includes providing a metallic side rail, and providing a cross member made from a composite material, the cross member having a protrusion. A portion of the side rail is positioned within a portion of the cross member in an overlapping manner, thereby forming an overlapping portion, where the protrusion is within the overlapping portion. The method also includes the steps of disposing a metallic band around the overlapping portion, providing an inductor around the metallic band, and energizing the inductor to generate a magnetic field for collapsing the band about the overlapping portion at a velocity sufficient to magnetic pulse weld the band and side rail to each other, thereby securing the side rail and the cross member together, wherein the metallic band is crimped over the protrusion.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
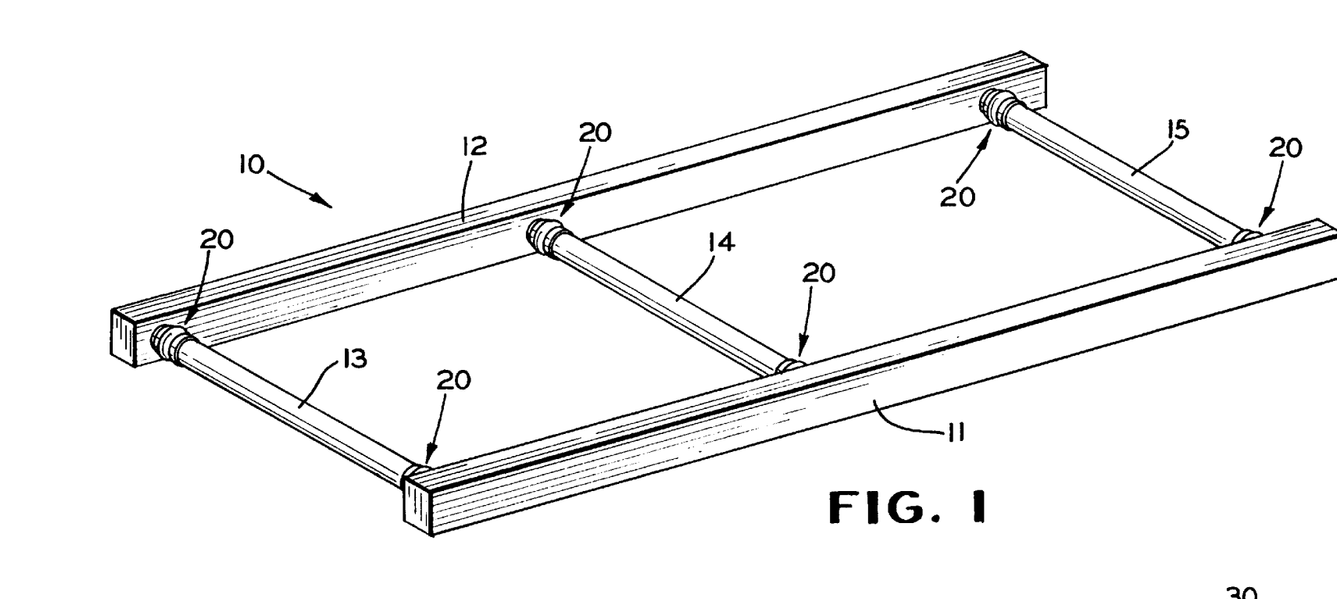
FIG. 1 is a schematic perspective view of a vehicle body and frame assembly manufactured in accordance with the method of this invention.

Referring now to the drawings, there is schematically illustrated in FIG. 1 a vehicle body and frame assembly, indicated generally at 10, that has been manufactured in accordance with the method of this invention. The illustrated vehicle body and frame assembly 10 is a ladder frame assembly. However, it will be appreciated that the method of this invention may be utilized in the manufacture of any type of vehicle body and frame assembly, such as a unitized body and frame assembly where the structural components of the body portion and the frame portion are combined into an integral unit.

The illustrated ladder frame assembly 10 includes a pair of longitudinally extending side rails 11 and 12 having a plurality of transverse cross members 13, 14, and 15 extending therebetween. The side rails 11 and 12 extend longitudinally along the length of the assembly 10 and are generally parallel to one another. The illustrated side rails 11 and 12 may be formed from single members that extend along the entire length of the assembly 10, as shown, while in other vehicle body and frame assembly designs the side rails 11 and 12 might extend for only a portion of the length of the frame assembly 10. The side rails 11 and 12 can be formed having any desired structure, as is well known to those skilled in the art and may be formed from any desired material.

The cross members 13, 14, and 15 extend generally perpendicular to the side rails 11 and 12. The cross members 13, 14, and 15 are spaced apart from one another along the length of the assembly 10. The cross members 13, 14, and 15 are secured to the side rails 11 and 12 at a joint, indicated generally at 20, in accordance with the method of this invention, as described below. When secured to the side rails 11 and 12, the cross members 13, 14, and 15 provide desired rigidity to the assembly 10. Although three cross members 13, 14, and 15 are shown in FIG. 1, it will be appreciated that a greater or lesser number of such cross members may be provided. The cross members 13, 14, and 15 can be formed having any desired structure and may be formed from any desired material.

In the illustrated embodiment, both the side rails 11 and 12 and the cross members 13, 14, and 15 are shown as closed channel structures, although the method of the invention can be used with channel structures of other configurations. Closed channel structural members can be characterized as having a continuous cross sectional shape, such as tubular or box-shaped channel members, for example. In contrast, open channel structural members can be characterized as having a non-continuous cross sectional shape, such as C-shaped or hat-shaped channel members, for example. Such open channel structural members are relatively easy and inexpensive to shape into desired configurations and to secure together. Closed channel structural members are desirable because they are generally stronger and more rigid than open channel structural members of comparable weight.

In a preferred embodiment of this invention, one of the two vehicle frame components, for example one of the cross members 13, 14, or 15, to be joined together at a joint 20, is made from a non-metallic material, while the other component, for example a side rail 11 or 12, is made from a metallic material. Thus, the illustrated joint 20 connects a metallic frame component to a non-metallic component. However, the method of this invention is equally suitable to form a joint 20 between two frame components made from any two dissimilar materials, even where the two dissimilar materials are generally not joinable by conventional techniques. As such, the inventive method may be used to join two frame components made from dissimilar metals or to join two frame components made from one metallic material and another, different non-metallic (or non-weldable) material.

The method for joining two vehicle frame components made from dissimilar materials in accordance with this invention is shown in FIGS. 2 through 5. In a first step of the method shown in FIG. 2, a metallic side rail 11 and a non-metallic cross member 13 are provided. In the illustrated embodiment, both the side rail 11 and the cross member 13 are shown as closed channel structures, although such is not required. Metallic materials suitable for use in a vehicle frame component include, but are not limited to, steel, aluminum, magnesium, and alloys thereof Non-metallic material suitable for use in a vehicle frame component include, but are not limited to plastics, layered composites, fiber matrix composites (such as an arimid/glass/carbon composite), or combinations thereof Other non-metallic materials include reinforced inorganic composite materials and laminate materials. For purposes of this invention, all of these non-metallic materials are referred to as "composite materials".

Figure 2:
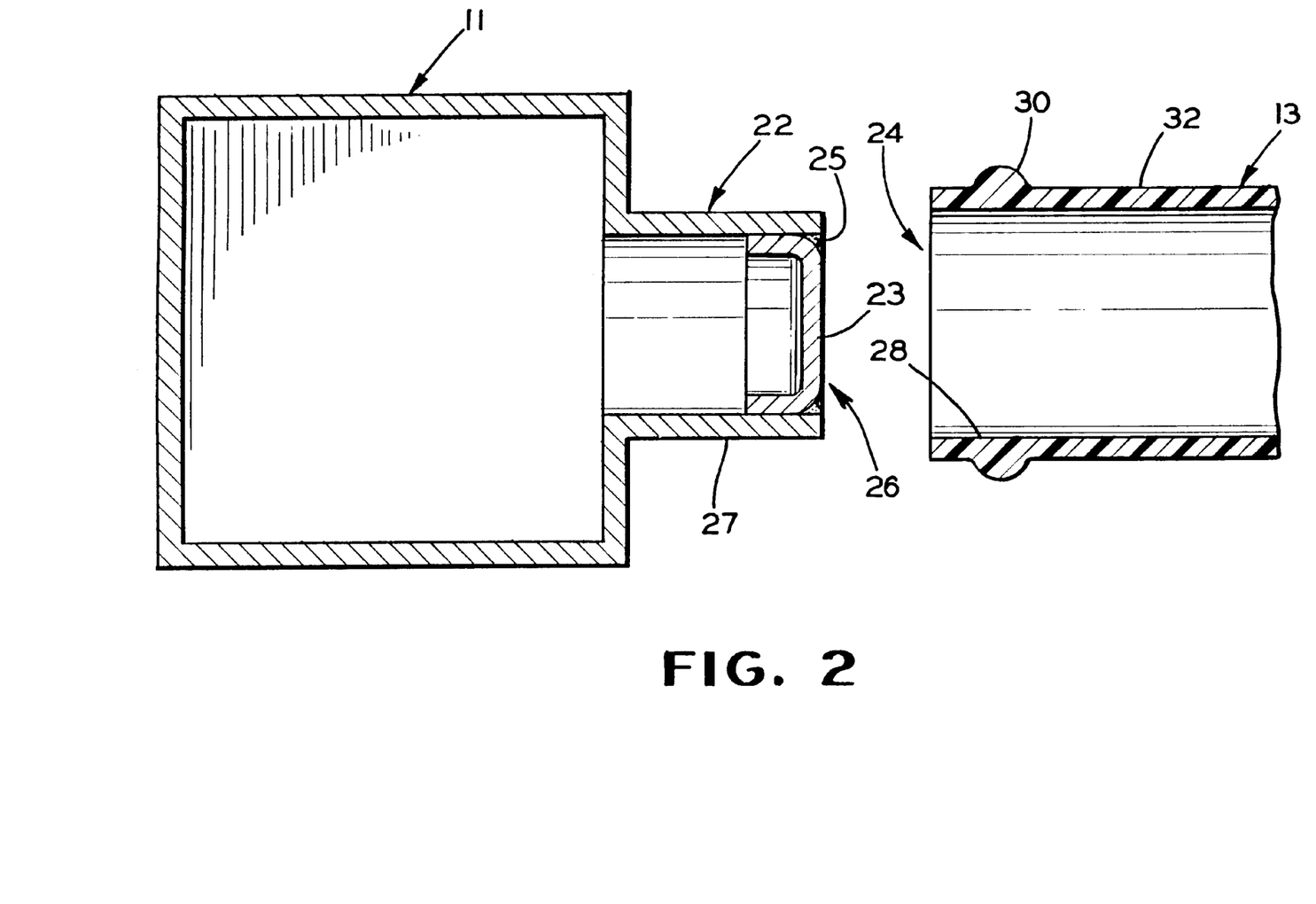
FIGS. 2 through 5 are enlarged cross-sectional views in elevation of a portion of the vehicle body and frame assembly illustrated in FIG. 1 sequentially illustrating the steps in the method for securing a non-metallic cross member to a metallic side rail in accordance with this invention.
Figure 8:
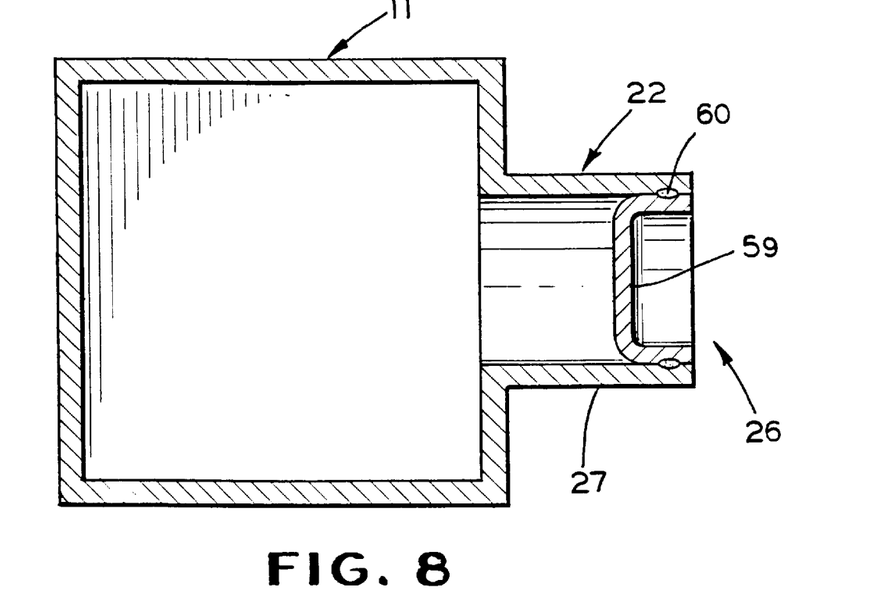
FIG. 8 is a view similar to that shown in FIG. 2, but with the flange having an outwardly oriented insert.

The side rail 11 includes a flange 22 or other portion of the side rail which extends from the side rail 11 at a location where it is desired to attach the cross member 13. In order to provide the rigidity and stiffness necessary for a successful magnetic pulse welding process, an insert 23 is positioned within the flange. The insert 23 can be attached by any suitable method, such as by applying a grove weld 25. The flange 22 is adapted to be received within a portion of the cross member, such as open end 24. The cross sectional shape of the flange 22 should be compatible with the cross sectional shape of the cross member 13. Additionally, the perimeter of the outer surface 27 of the flange 22 should be slightly smaller than the perimeter of the inner surface 28 of the cross member 13 so that the cross member can be inserted into the flange 22 of the side rail. Alternatively, as will be explained below, and as illustrated in FIG. 8, the cross member 13 may be adapted to be received within the open end 26 of the flange 22. In a preferred embodiment, both the flange 22 and the cross member 13 have a generally tubular or otherwise continuous cross section.

In the illustrated embodiment, the cross member 13 includes a protrusion 30 disposed on its outer surface 32. As shown therein, the protrusion 30 has a generally, semicircular cross section, although this is not required. The protrusion 30 may extend around the entire perimeter of the outer surface 32 of the cross member 13, or only a portion thereof. In addition, one or more rows of protrusions 30 may be positioned on the outer surface 32 of the cross member 13 along its axial length.

Figure 3:
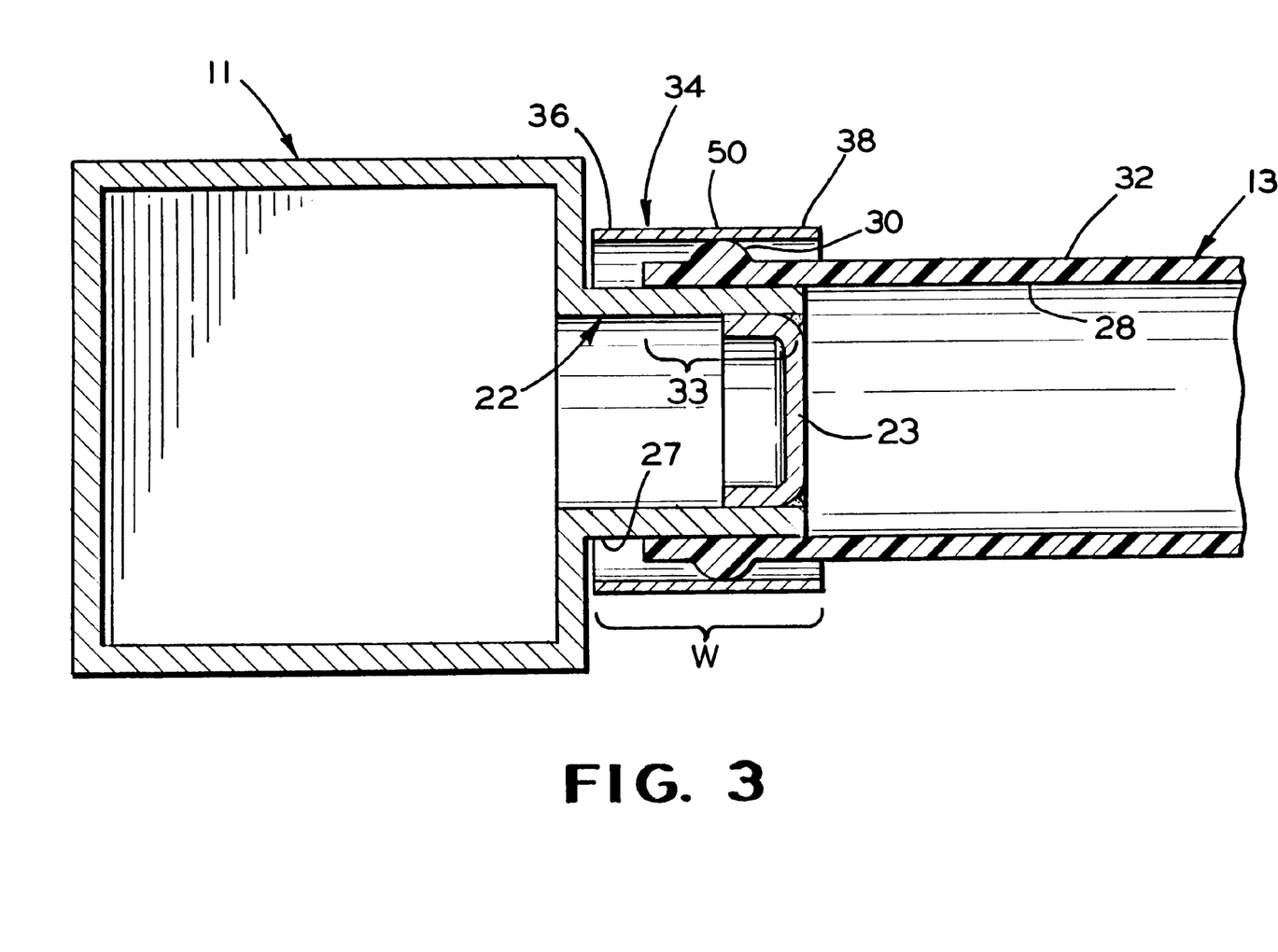

The second step in the method of this invention, as illustrated in FIG. 3, is to position the open end 24 of the cross member 13 on the flange 22 such that a portion of the inner surface 28 of the cross member 13 overlaps and contacts a portion of the outer surface 26 of the flange 22. The overlapping portion is indicated at 33. Next a metallic band 34 is disposed around the overlapping portions of the cross member 13 and the flange 22. The metallic band 34 may be a continuous, annular-shaped member or a flat sheet which is deformed around the outer perimeter of the cross member 13 and retained thereon. Preferably, the metallic band 34 perimeter of the c entire perimeter of the cross member 13 and flange 22, but such is not necessary. The metallic band 34 preferably has a width W sufficient to extend across the width of the protrusion 30 and the overlapping portion 33. The band is provided with two edge portions 36 and 38 that are aligned on either sides of the protrusion. The edge portions 36 and 38 are adapted to contact the flange 22 and the cross member 13, respectively, when formed radially inwardly by magnetic pulse welding or by crimping. It should be noted that the protrusion 30 is provided on the outermost of the two frame components, i.e. the frame component which is disposed around or outside the other frame component. Thus, if the cross member is disposed around a portion of the side rail flange 22, then the cross member is the outermost frame component, and the protrusion 30 is formed on the outer surface 32 of the cross member.

Figure 4:
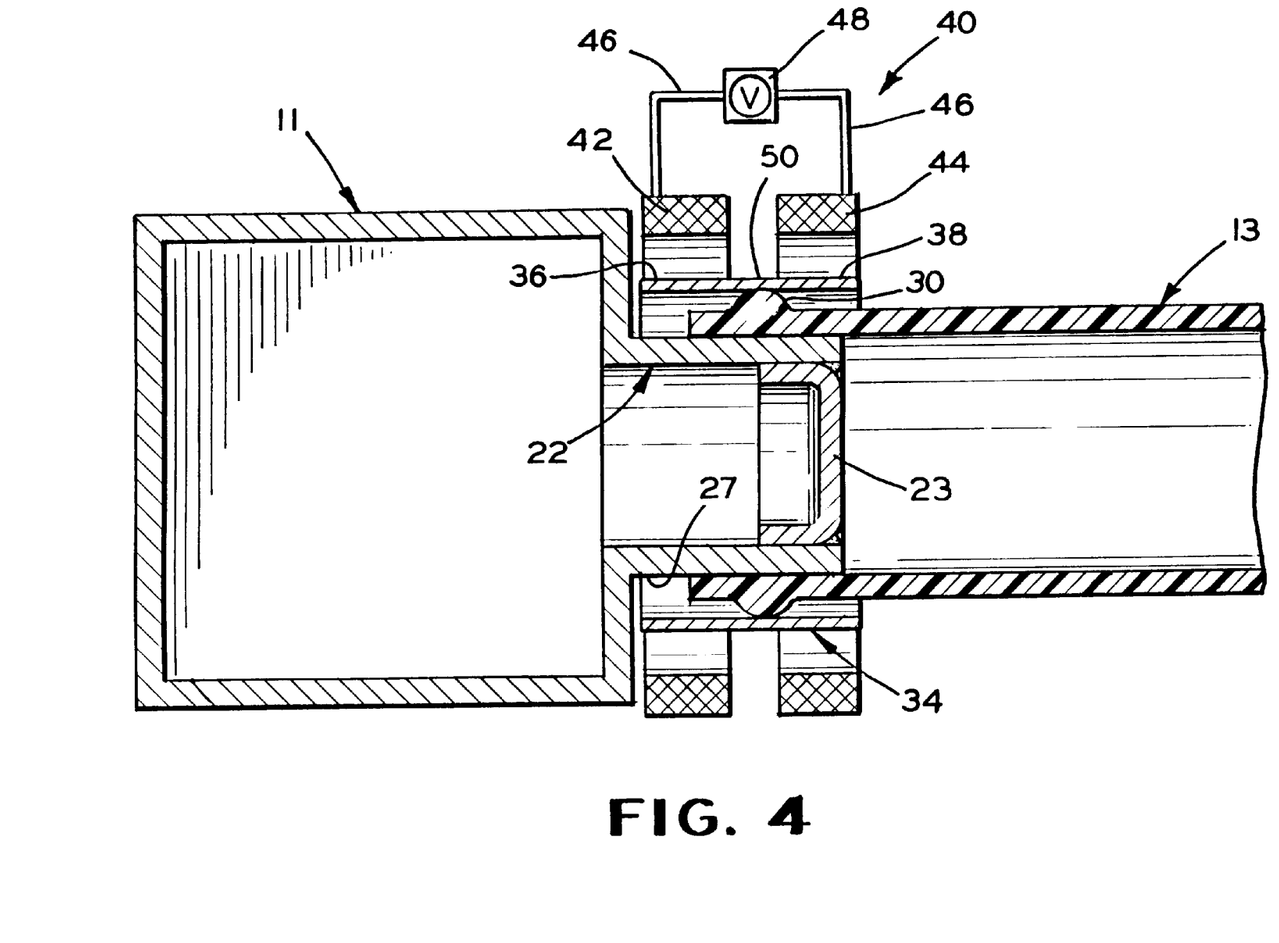
Figure 5:
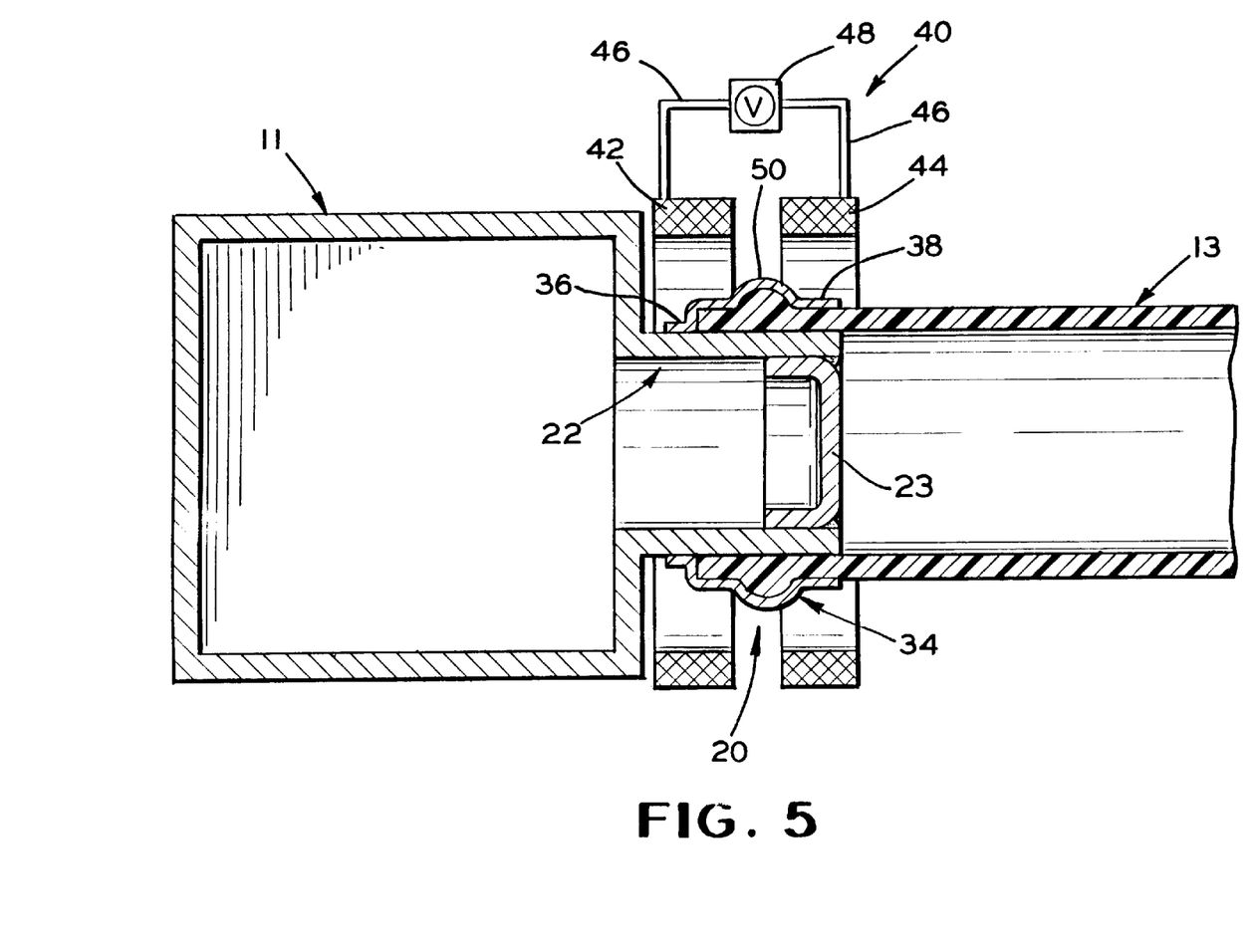

The third step in the method of this invention is illustrated in FIGS. 4 and 5. As shown, a band perimeter reduction device, such as magnetic pulse welding apparatus indicated generally at 40, is disposed around the metallic band 34 and around and adjacent the overlapping portion 33 of the cross member 13 and flange 22. The electromagnetic pulse apparatus 40 is adapted to generate an intense, momentary magnetic field on a localized portion of the metallic band 34. The intense magnetic field applied at a localized area creates inwardly directed forces which cause the metallic band 34 to collapse inwardly at that area, thereby reducing its size until it contacts either the cross member 13 or the flange 22. The contact of the two metallic members at such high velocities causes the two metallic members to be welded together.

In the illustrated embodiment, the magnetic pulse welding apparatus 40 includes a pair of inductor coils 42 and 44. One type of inductor coil which may be used with this invention is a massive high-strength single-turn coil (not shown.) A preferred type of coil for use with this invention is a high strength coil comprised of plurality of generally flat, closely packed, but spaced-apart, nearly circular or annular electrical conductor strips (not shown). The conductor strips can be helically bent at a pitch which insures a displacement of the ends or leads of the conductor strips relative to each other. Insulators (not shown) are positioned between adjacent conductor strips. Preferably, the inductor coils 42 and 44 are similar to that disclosed in U.S. Pat. No. 4,129,846 to Yablochnikov, which is hereby incorporated by reference. The preferred multiple-turn coil is preferable over a single-turn coil because it provides a uniformly azimuthal distribution of the magnetic field.

The magnetic pulse welding apparatus 40 includes leads or terminals 46 which connect a source of power 48 to the inductor coils 42 and 44. The magnetic pulse welding apparatus 40 includes one or more high voltage capacitors (not shown) and a discharge circuit (not shown) which is suitable for conducting a momentary current of great magnitude. The main parts of each magnetic pulse welding apparatus are a capacitor bank, inductor and high current switching device. The current required for successful localized deformation on a hollow metallic member used in a vehicle frame component, such as the band 34, is on the order of at least several hundred thousand amps, and possibly as high as one million amps or more. The discharge circuit and the capacitors operate to supply an energy spike or surge to the inductor coils 42 and 44. Further details of magnetic pulse welding are given in U.S. patent application Ser. No. 880,177, filed Jun. 20, 1997, which is hereby incorporated by reference. The inductor coils 42 and 44 create a strong magnetic field that exerts a force against the outer surface of the band 34. The effect of the intense, momentary magnetic field on the metallic band 34 is to create an extremely powerful force which repels or drives away the band 34 radially inwardly from the inductor coils 42 and 44. The magnetic field created by the pulse of current through the inductor coil 42 and 44 creates strong reactive eddy currents in the metallic band 34. The eddy currents create opposing magnetic fields which result in inwardly directed forces on the metallic band 34. These forces cause the band 34 to collapse about a localized area, reducing its size until it contacts the flange 22, the protrusion 30, and the cross member 13, thereby crimping or clinching the band 34.

The amount that the metallic band 34 is reduced in size can be affected by the size and shape of the inductor coils 42 and 44 and the strength and shape of the electromagnetic field. In addition, these factors affect the velocity of the metallic band as it is reduced in size. The strength of the electromagnetic coil may be increased to a point wherein the high velocity impact of the metallic band against the other metallic surface welds the two metallic surfaces together. In the illustrated embodiment, the coil 42 disposed around the portion of the metallic band 38 located above the metal flange 22 is preferably adapted to both reduce the size of the band 34 until it contacts the metal flange 22 and to weld the band 34 to the flange 22. In contrast, the coil 44 disposed around the portion of the metallic band 38 located above the non-metallic cross member 13 is preferably adapted to only reduce the size of the band until it contacts the cross member 13, thereby crimping or clinching the metallic band around the protrusion 30. As can be seen in FIG. 5, one part of the band 34, i.e., edge portion 36, is welded to the flange 22, whereas the other part of the band 34, the edge portion 38, is attached to the cross member 13 by crimping or clinching the band around the protrusion 30.

In an alternative embodiment, a single, graduated coil, not shown, is provided for the magnetic pulse welding step. This graduated coil is adapted to provide electromagnetic fields of different strengths across the width of the band 34. In this embodiment, the graduated coil is used to sequentially reduce or crimp the various portions of the metallic band, such as section 36 located adjacent the flange 22, central section 50 located above the protrusion 30, and section 38 located adjacent the cross member 13.

Figure 6:
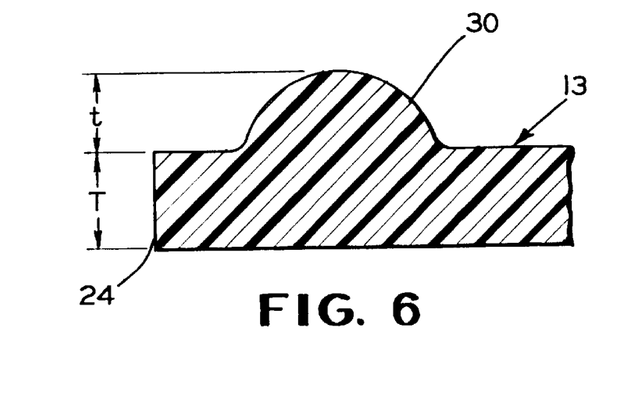
FIG. 6 is an enlarged view of the end of the cross member of FIG. 2.

As shown in FIG. 5, the magnetic pulse welding apparatus 40 is operated so that the coils 42 and 44 each create an electromagnetic field which causes the metallic band 34 to be reduced in size around the flange 22, the protrusion 30, and the cross member 13. The coil 42 is operated such that the section 36 of the metallic band 34 is also welded to the flange 22, thereby forming the joint 20 between the cross member and the side rail. The reduction of the metallic band 36 and 38 on both sides of the protrusion 30 functions as a mechanical lock by crimping or clinching to secure the cross member 13 to the flange 22. Although the protrusion 30 is shown as an arcuate surface, being somewhat less than a semicircle in cross-sectional profile, it is to be understood that the protrusion can be configured in numerous other shapes, as long as the protrusion can function as a mechanical lock by crimping or clinching to secure the cross member 13 to the flange 22. The protrusion 30 should have sufficient height and shape to act as an effective locking device for crimping. Preferably the protrusion 30 has a thickness t within the range of from about 70 percent to about 150 percent of the thickness T of the cross member, as shown in FIG. 6, although the protrusion can have other heights. It is to be understood that although the joint 20 is illustrated as being formed in part by mechanical crimping or clinching of the edge portion 38 of the band 34 to the cross member 13, the bond can be effected or enhanced by the use of adhesive, with or without the use of crimping or clinching.

Figure 7:
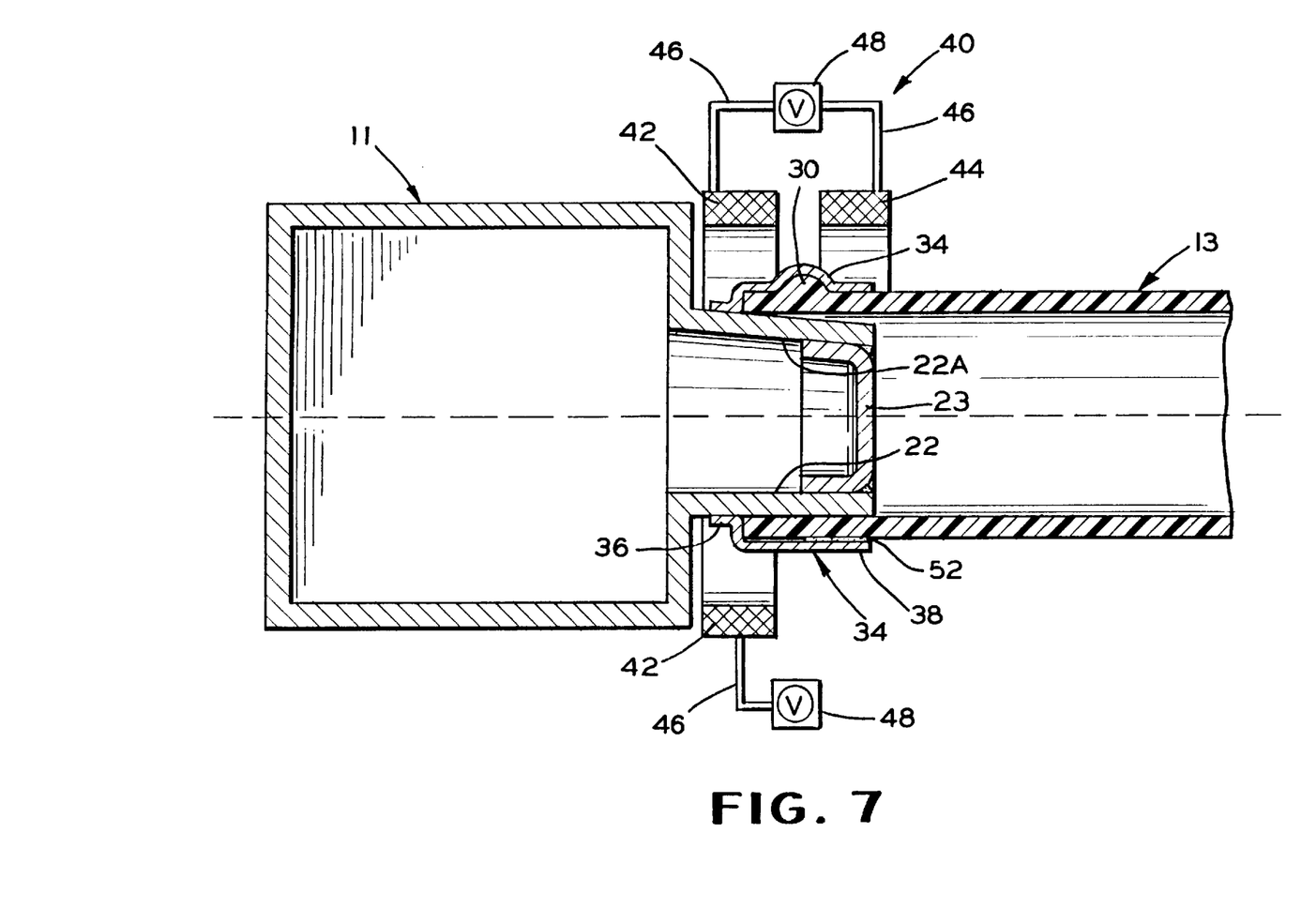
FIG. 7 is a cross sectional view of alternative embodiments of joints made between dissimilar frame components in accordance with the method of this invention.

Alternative embodiments of a joint between dissimilar materials using the method of this invention are shown in FIG. 7. In the top portion of this drawing, a second embodiment includes a tapered flange 22A which narrows as it extends away from the side rail 11. This tapered flange 22A is generally easier to manufacture than straight flanges. The band 34 is attached using magnetic pulse welding as disclosed above. The attachment of the band 34 with the cross member 13 can be made by crimping or clinching, as shown. Alternatively, the attachment of the band to the cross member can be made with an adhesive.

In a third embodiment as shown in the lower portion of FIG. 7, a single coil 42 is used to reduce the size of the band 34 around the cross member 13 and the flange 22. In this embodiment, the coil 42 is disposed closer to the flange 22 so that the edge portion 36 of the band 34 is also welded to flange 22. A layer of adhesive 52 may be provided between the overlapping portions of the cross member 13 and the flange 22 and/or between the overlapping portions of the band 34 and the cross member 13 to adhere the edge portion 38 of the band to the cross member 13. It should be appreciated that the strength of the joint 20 may be increased as necessary by using more than one protrusion 30 along the axial length of the outermost frame component. Other means of increasing the joint 20 include the use of additional adhesive layers 52 between the two frame components, and increased contact areas between the two metal components (i.e. the metallic band 34 and a metallic flange 22 or metallic cross member 13).

As shown in FIG. 8, an inverted insert 59, which is the inverse of the insert 23 of FIG. 2, can be used as an alternative to insert 23. The insert can be fixed to the flange 22 by any suitable means, such as several spot welds 60.

Figure 9:
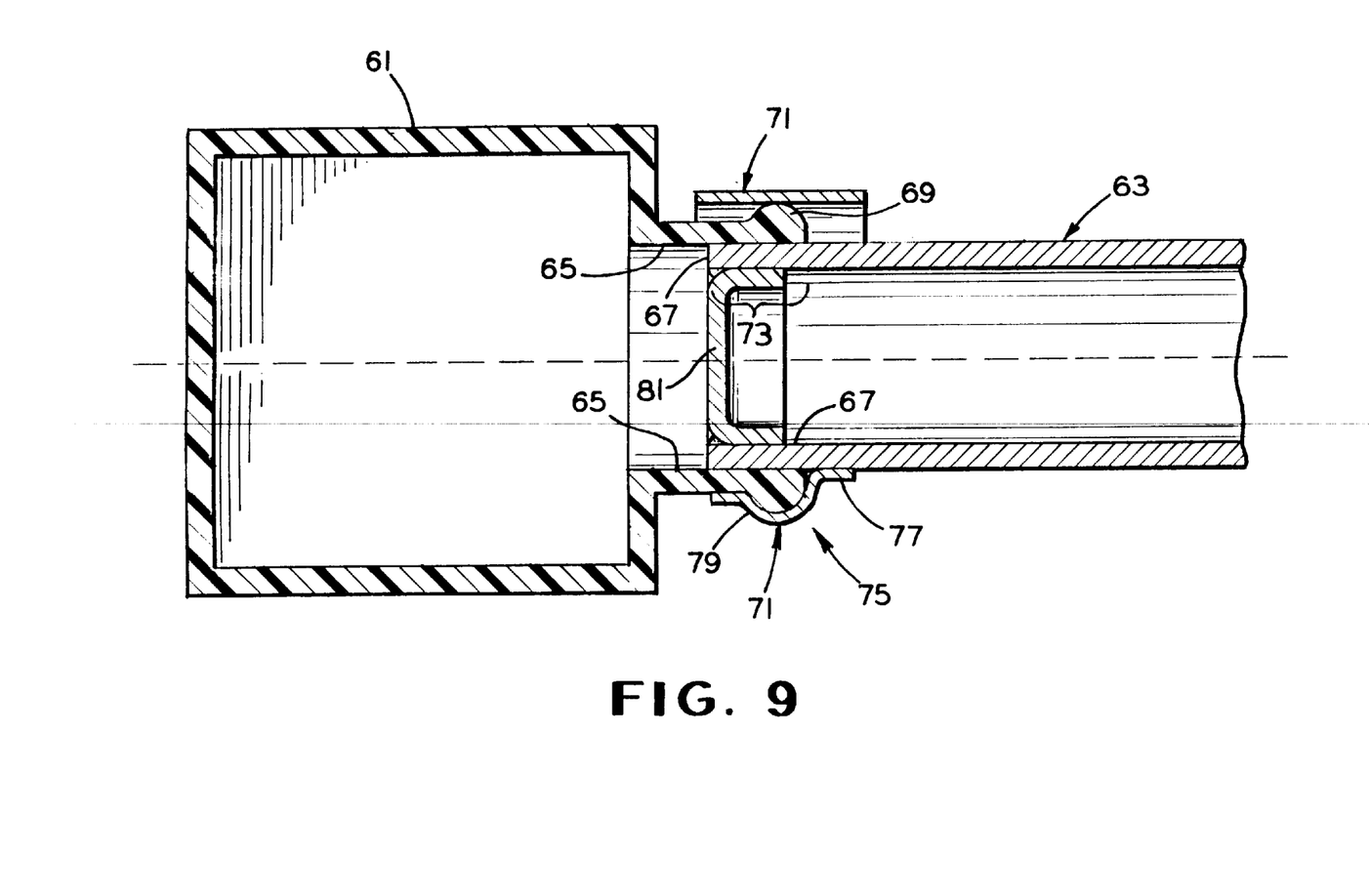
FIG. 9 is a view similar to that shown in FIGS. 3 and 5, but with the frame rail being made of a composite material and the cross member being made of a metallic material.

As shown in FIG. 9, the side rail 61 could be formed from the non-metallic material or composite material while the cross member 63 is formed from the metallic material. In this embodiment of the invention the flange 65, which is a portion of the side rail 61, is positioned to surround or receive the end portion 67 of the cross member 63. The flange 65 is provided with a protrusion 69, and a metallic band 71 is provided adjacent the overlapping portion 73 of the joint. As shown in the lower portion of FIG. 9, the completed joint 75 is formed when the magnetic pulse welding apparatus, not shown in FIG. 9, is used to weld one edge portion 77 of the band 71 to the metallic cross member 63 while the other edge portion 79 of the band is attached to the flange 65 by crimping or clinching as shown, or by adhesive or other means.

Figure 10:
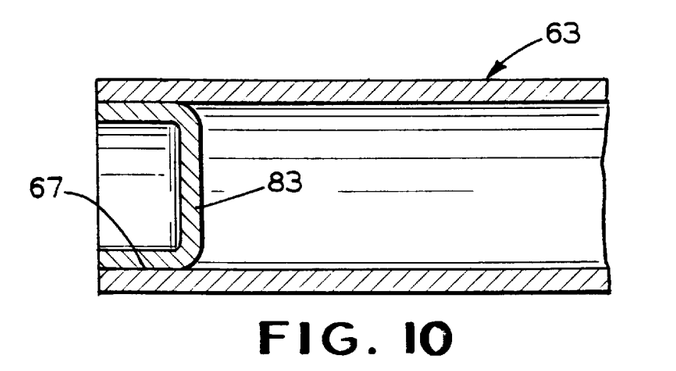
FIG. 10 is a partial cross-sectional view of a metallic cross member similar to that shown in FIG. 9, but having an outwardly oriented insert similar to that shown in FIG. 8.
Figure 11:
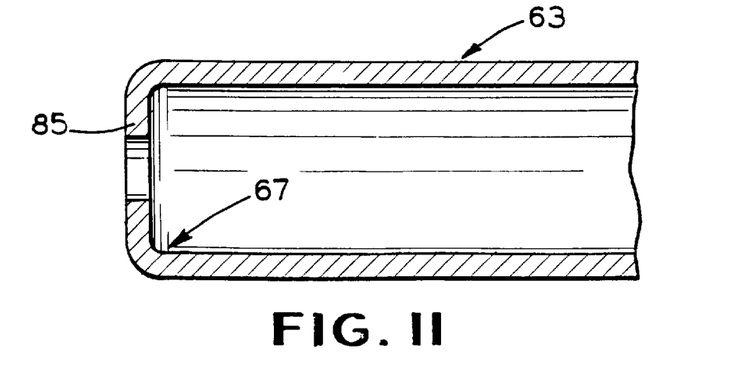
FIG. 11 is a partial cross-sectional view of a metallic cross member similar to that shown in FIG. 9, but having an inwardly turned flange.

In a manner similar to that shown in FIG. 2, an insert 81 is positioned within the metallic cross member 63 to provide support during the magnetic pulse welding process. As shown in FIG. 10, an outwardly oriented insert 83 can be used instead of the inwardly oriented insert 81 of FIG. 9. Also, as shown in FIG. 11, the end portion 67 of the metallic cross member 63 can be formed with an inwardly turned flange 85. Both the outwardly oriented insert 83 and the inwardly turned flange 85 provide support for the end portion 67 of the cross member 63 during the magnetic pulse welding process.

Figure 12:
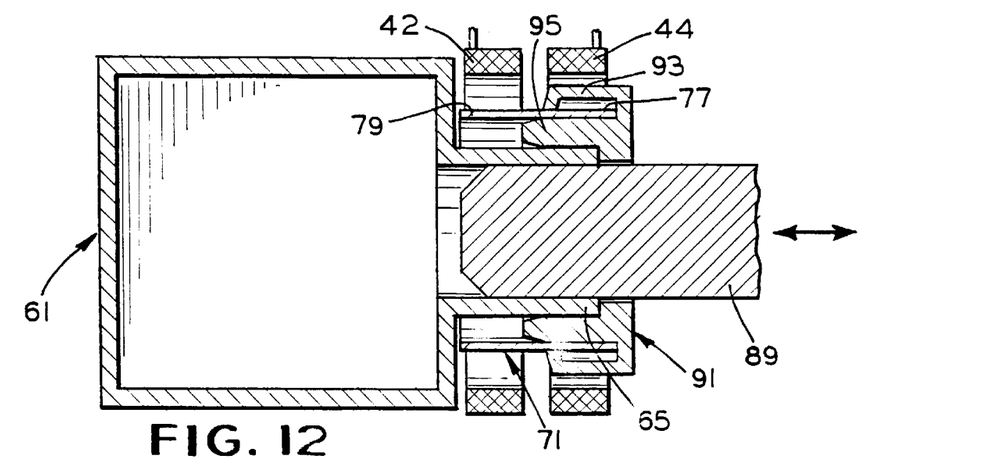
FIGS. 12–14 are sequential cross-sectional views in elevation of a joint similar to that shown in FIG. 9 being formed using an insertable mandrel.
Figure 13:
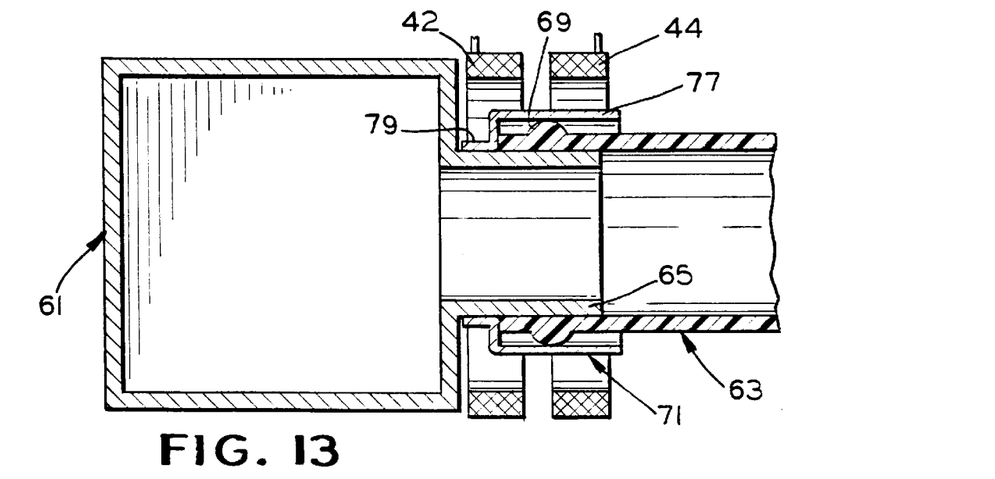
Figure 14:
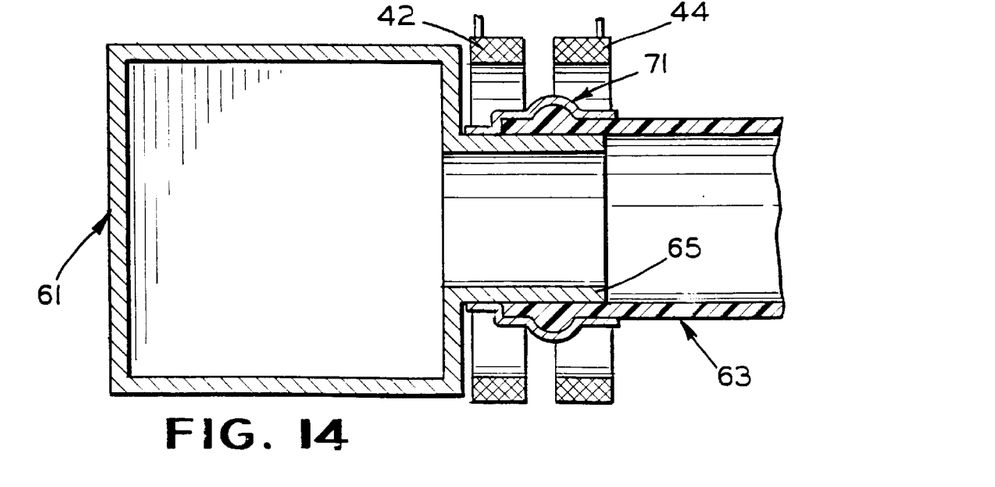

As shown in FIGS. 12-14, in another embodiment of the invention, an insertable mandrel 89 can be removably positioned within the opening of the flange 65 to provide to provide support for the metallic cross member 65 during the magnetic pulse welding process. An optional jig 91 or other similar fixture can be inserted or positioned at the same time as the mandrel 89 to hold the band 71 in place during the welding process. The jig can be provided with a clamp 93 and a spacer member 95, with the clamp holding the edge portion 77 of the band in place. In the welding process the edge portion 79 of the band 71 is first magnetic pulse welded to the flange 65, with the mandrel 89 in position as shown in FIG. 12. This welding is accomplished by the intense, momentary magnetic field on the edge portion 79 that creates an extremely powerful force which repels or drives away the edge portion 79 radially inwardly from the inductor coil 42. The result is that the edge portion 79 is welded to the flange 65 as shown in FIG. 13. The next step is the magnetic pulse crimping or clinching of edge 77 of the metallic band 71, with the mandrel 89 removed and the metallic cross member 63 moved into place as shown in FIG. 13. This is accomplished by the creation of an intense magnetic field by the inductor coil 44, and the result is the edge portion 77 being crimped around the protrusion 69, as shown in FIG. 14.

The principle and mode of operation of this invention have been described in its preferred embodiments. However, it should be noted that this invention may be practiced otherwise than as specifically illustrated and described without departing from its scope.

What is claimed is:

1. A method of joining two vehicle frame components made from dissimilar materials, the method comprising the steps of:

a. providing a first frame component;

b. providing a second frame component made from a material that is dissimilar to a material used to make the first frame component, wherein at least one of the first and second frame components is made from a metallic material;

c. positioning a portion of the first frame component within a portion of the second frame component in an overlapping manner, thereby forming an overlapping portion;

d. disposing a metallic band around the overlapping portion;

e. providing an inductor around the metallic band; and f. energizing the inductor to generate a magnetic field for collapsing the metallic band about the overlapping portion and magnetic pulse welding the metallic band to the metallic component, thereby securing the first and second frame components together.

2. The method of claim 1 in which both the first and second components are metallic components.

3. The method of claim 1 in which the first component is a side rail and the second component is a cross member.

4. The method of claim 3 in which the side rail is made of a metallic material and the cross member is made of a composite material.

5. The method of claim 4 in which a portion of the side rail is positioned within a portion of the cross member to form the overlapping portion.

6. The method of claim 3 in which a portion of the side rail is positioned within a portion of the cross member to form the overlapping portion.

7. The method of claim 1 in which the first component is a side rail and the second component is a cross member, where a portion of the cross member is positioned within a portion of the side rail to form the overlapping portion.

8. The method of claim 1 in which an insert is positioned within the metallic component to provide support for the metallic component during the step of welding the band and the metallic component to each other.

9. A method of joining two vehicle frame components made from dissimilar materials, the method comprising the steps of:

a. providing a first frame component made from a metallic material;

b. providing a second frame component made from a composite material, the second frame component having a protrusion;

c. positioning a portion of the first frame component within a portion of the second frame component in an overlapping manner, thereby forming an overlapping portion, wherein the protrusion is within the overlapping portion;

d. disposing a metallic band around the overlapping portion;

e. providing an inductor around the metallic band; and f. energizing the inductor to generate a magnetic field for collapsing the metallic band about the overlapping portion and magnetic pulse welding the metallic band to the metallic component, thereby securing the first and second frame components together, wherein the metallic band is crimped over the protrusion.

10. The method of claim 9 in which the protrusion is a peripheral rim on the second frame component.

11. The method of claim 9 in which the second component has a circular cross-section, and the protrusion is annular.

12. The method of claim 11 in which the first component is a side rail and the second component is a cross member.

13. The method of claim 9 in which the protrusion is integrally molded with the second frame component.

14. The method of claim 13 in which the protrusion has a thickness within the range of from about 70 percent to about 150 percent of the thickness of the second frame component.

15. A method of joining two vehicle frame components made from dissimilar materials, the method comprising the steps of:

a. providing a metallic side rail;

b. providing a cross member made from a composite material, the cross member having a protrusion;

c. positioning a portion of the side rail within a portion of the cross member in an overlapping manner, thereby forming an overlapping portion, wherein the protrusion is within the overlapping portion;

d. disposing a metallic band around the overlapping portion;

e. providing an inductor around the metallic band; and f. energizing the inductor to generate a magnetic field for collapsing the metallic band about the overlapping portion and magnetic pulse welding the metallic band to the side rail, thereby securing the side rail and the cross member together, wherein the metallic band is crimped over the protrusion.

16. The method of claim 15 in which the protrusion has a thickness within the range of from about 70 percent to about 150 percent of the thickness of the second frame component.

17. The method of claim 15 in which the protrusion is an annular peripheral rim on the cross member, and the cross member has a circular cross-section.

18. The method of claim 17 in which the protrusion is integrally molded with the second frame component.

19. The method of claim 18 in which the protrusion has a thickness within the range of from about 70 percent to about 150 percent of the thickness of the second frame component.

20. The method of claim 19 in which an insert is positioned within the metallic component to provide support for the metallic component during the step of welding the band and the side rail to each other.

* * * * *